United States Patent [19]

Zhao

[11] Patent Number: 5,450,523
[45] Date of Patent: Sep. 12, 1995

[54] TRAINING MODULE FOR ESTIMATING MIXTURE GAUSSIAN DENSITIES FOR SPEECH UNIT MODELS IN SPEECH RECOGNITION SYSTEMS

[75] Inventor: Yunxin Zhao, Santa Barbara, Calif.

[73] Assignee: Matsushita Electric Industrial Co., Ltd., Osaka, Japan

[21] Appl. No.: 71,334

[22] Filed: Jun. 1, 1993

Related U.S. Application Data

[63] Continuation of Ser. No. 676,288, Mar. 19, 1991, abandoned, which is a continuation-in-part of Ser. No. 613,352, Nov. 15, 1990, Pat. No. 5,193,142.

[51] Int. Cl.$^6$ ............................................. G10L 9/00
[52] U.S. Cl. .................................. 395/2.52; 395/2.65
[58] Field of Search .............................. 381/41–49; 395/2.4–2.66

[56] References Cited

U.S. PATENT DOCUMENTS

| | | | |
|---|---|---|---|
| 4,741,036 | 4/1988 | Bahl et al. | 381/43 |
| 4,783,804 | 11/1988 | Juang et al. | 381/43 |
| 4,833,712 | 5/1989 | Bahl et al. | 381/43 |

OTHER PUBLICATIONS

Juang et al., "Recent Developments in the Application of Hidden Markov Models to Speaker-Independent Isolated Word Recognition", Proc. IEEE International Conference of Acoustics, Speech and Signal Processing, Mar. 1985, pp. 9–12.

*Primary Examiner*—Allen R. MacDonald
*Assistant Examiner*—Michelle Doerrler
*Attorney, Agent, or Firm*—Price, Gess & Ubell

[57] ABSTRACT

A model-training module generates mixture Gaussian density models from speech training data for continuous, or isolated word speech recognition systems. Speech feature sequences are labeled into segments of states of speech units using Viterbi-decoding based optimized segmentation algorithm. Each segment is modeled by a Gaussian density, and the parameters are estimated by sample mean and sample covariance. A mixture Gaussian density is generated for each state of each speech unit by merging the Gaussian densities of all the segments with the same corresponding label. The resulting number of mixture components is proportional to the dispersion and sample size of the training data. A single, fully merged, Gaussian density is also generated for each state of each speech unit. The covariance matrices of the mixture components are selectively smoothed by a measure of relative sharpness of the Gaussian density and the smoothing can also be done blockwise. The weights of the mixture components are set uniformly initially, and are reestimated using a segmental-average procedure. The weighting coefficients, together with the Gaussian densities, then become the models of speech units for use in speech recognition.

11 Claims, 6 Drawing Sheets

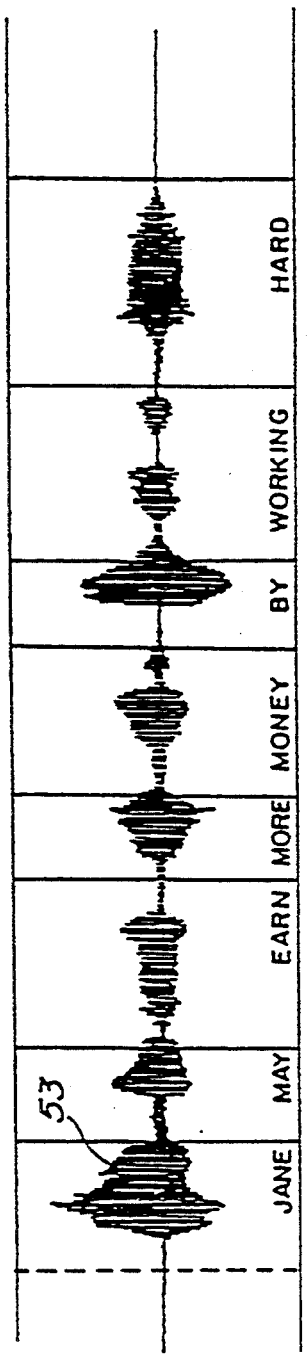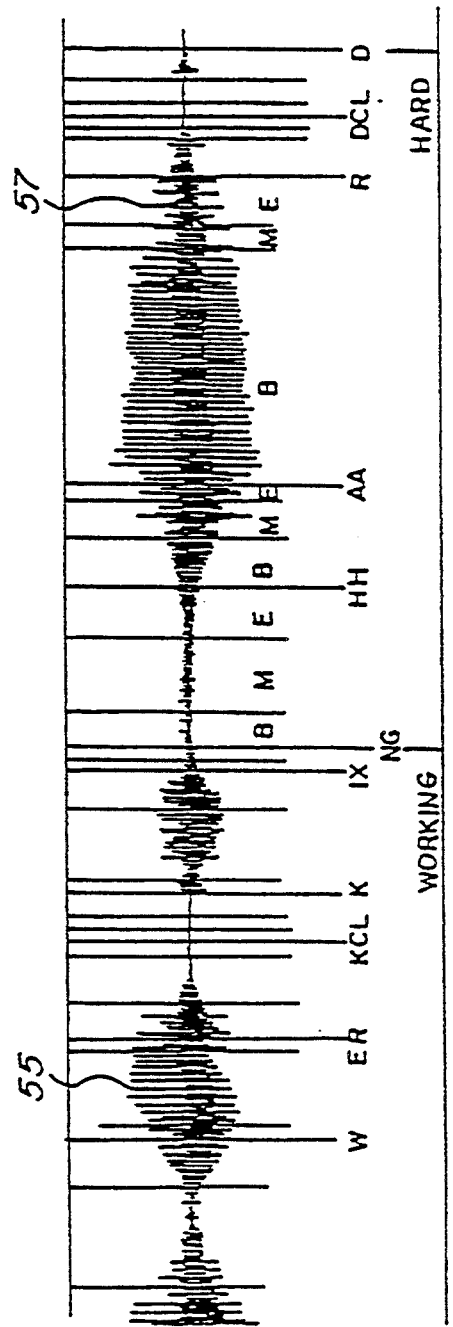
FIG. 3(a)
FIG. 3(b)

TRAINING MODULE FOR ESTIMATING MIXTURE GAUSSIAN DENSITIES FOR SPEECH UNIT MODELS IN SPEECH RECOGNITION SYSTEMS

CROSS-REFERENCE TO RELATED APPLICATION

This application is a continuation of application Ser. No. 07/676,288 filed on Mar. 19, 1991, now abandoned for a Training Module for Estimating Mixture Gaussian Densities for Speech Unit Models in Speech Recognition Systems, which is a continuation-in-part of application Ser. No. 07/613,352, U.S. Pat. No. 5,193,142 filed Nov. 15, 1991 for A TRAINING MODULE FOR ESTIMATING MIXTURE GAUSSIAN DENSITIES FOR SPEECH-UNIT MODELS IN SPEECH RECOGNITION SYSTEMS.

BACKGROUND OF THE INVENTION

1. Field of the Invention

The present invention relates to speech recognition in general and, in particular, to estimating mixture Gaussian densities of speech-unit models for hidden Markov model (HMM) based speech recognition systems.

2. Description of Related Art

In speech recognition systems, particularly in hidden Markov model based speech recognition systems, a training module which generates probabilistic models of speech units is a very important component. Its functionality affects the system recognition performance significantly. Among the probabilistic models of speech units, mixture Gaussian density models have been successfully used in models of word unit or phoneme-sized unit for tasks such as isolated word recognition, as well as continuous speech recognition. A mixture Gaussian density consists of a plurality of Gaussian densities, $(\mu_i, C_i)$, i=1, ... K, and a plurality of weights for each Gaussian density, $a_i$, i=1, ... K, where $a_i \geq 0$ and $$\sum_{i=1}^{K} a_i = 1.$$

In a training module of a speech recognition system, the parameters of the Gaussian densities and the weights are estimated from the training speech data. The existing techniques of estimating parameters of mixture Gaussian density of models of speech units are primarily the extension of the Baum-Welsh algorithm, see B. H. Juang et al., "Mixture Autoregressive Hidden Markov Models for Speech Signals," IEEE Trans. ASSP, ASSP-33, pp. 1404-1413, and the segmental K-means algorithm, see L. R. Rabiner et al., "A Segmental K-means Training Procedure for Connected Word Recognition," AT&T Technical Journal, Vol. 65(3), pp. 21-31, which have been used successfully in some speech recognition systems. These techniques start from a chosen number of mixture components, and chosen initial parameters for each Gaussian density, and then iteratively improve the parameter estimates through likelihood maximization or distortion minimization. The likelihood or distortion is computed from frame-based scores of speech features, and the parameter estimates of a mixture Gaussian density are dependent on the initial choice of the number of mixture components, as well as the initial parameters of each Gaussian density.

The present invention provides a training module for speech recognition systems with a new technique for estimating the parameters of mixture Gaussian densities for models of speech units. The advantages of this technique will become readily apparent upon considering the present invention.

SUMMARY OF THE INVENTION

It is an object of the present invention to estimate a mixture Gaussian density of a model of a speech unit without the need for fixing the number of mixture components a priori. Instead, the number of components of a mixture density is proportional to the dispersion and sample size of the training data.

It is another object of the present invention to estimate a mixture Gaussian density of a model of a speech unit without the need for initializing parameters of each mixture component, thus making the estimates of model parameters independent of the initial conditions.

It is a further object of the present invention to estimate a mixture Gaussian density of a model of a speech unit with the incorporation of the segmental structure of the speech signals. The description of speech signals by segmental structures takes into account the correlation between neighboring frames and is therefore more accurate than assuming independence between neighboring frames.

It is yet another object of this invention to provide reliable estimates of the parameters of mixture Gaussian densities.

It is still further an object of the present invention to provide a computation efficient method of estimating weights for the mixture densities.

The present invention is a module in a speech recognition system which trains models for speech units. The feature vectors, extracted from speech data, are supplied to the module for model training. The model training module groups together the segments corresponding to the same state and the same speech unit, and estimates a Gaussian density for each segment. Each set of the Gaussian densities are merged into a mixture Gaussian density. The number of mixture components in a mixture Gaussian density is proportional to the dispersion and sample size of its training data. The mixture Gaussian density model is estimated for each state of each speech unit. The weights of these Gaussian densities are estimated by a segmental-average procedure for each state of each speech unit under each speech-unit context environment. The mixture density models thus estimated are then used as reference models in the speech recognition process.

BRIEF DESCRIPTION OF THE DRAWINGS

The exact manner of operation of the present invention, as well as its advantages, may best be understood by reference to the following detailed descriptions, in conjunction with the accompanying drawings, in which like reference numerals designate like parts throughout the figures, and wherein:

FIGS. 3(a) and 3(b) are wave diagrams showing segmentation of a passage of speech;

FIG. 3(a) shows labeling of boundaries of words within a sentence;

FIG. 3(b) shows labeling of boundaries of segments within phonemes;

FIG. 7 is a flow chart illustrating another iterative procedure of model merging which consists of an iterative procedure of merging K pairs of Gaussian densities at a time, followed by the iterative procedure of merging one pair of Gaussian density at a time.

DESCRIPTION OF THE PREFERRED EMBODIMENTS

Figure 1:
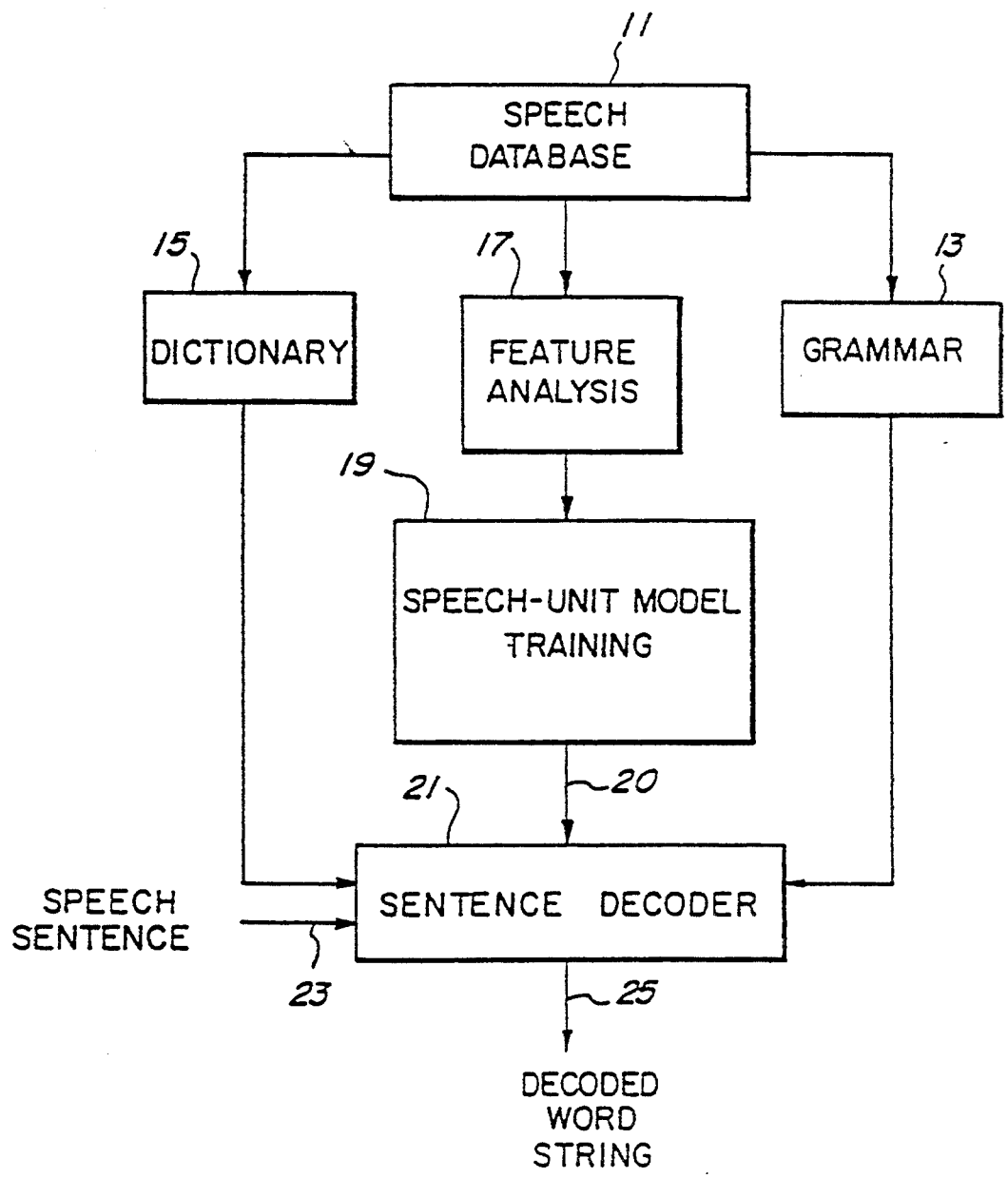
FIG. 1 is a block diagram of a continuous speech recognition system.

The present invention is implemented as a module for training mixture Gaussian density models for speech units in a continuous speech recognition system of the type illustrated in FIG. 1. From a corpus of training speech data, such as a speech database 11, the module of feature analysis 17 first converts speech data samples into a sequence of framed-based feature vectors, preferably the analysis parameters from a perceptually based linear prediction technique, see H. Hermansky et al., "Perceptually Based Linear Prediction Analysis of Speech," Proc. ICASSP, pp. 509–512, Tampa, Fla., 1985. The model training module 19, according to the present invention, takes as input the feature sequences and then generates mixture Gaussian density models for each speech unit. The dictionary 15 describes the composition of words from the speech unit models. The grammar module 13 describes the syntactic rules for making a sentence from word strings. The models of speech units from the output of the model training module 19, the dictionary 15, and the grammar 13 are used as reference for the decoder 21 in decoding a spoken sentence 23 into a decoded word string 25. Note that the training module 19 can also be used with equal effect in speech recognition systems for recognizing isolated words.

Figure 2:
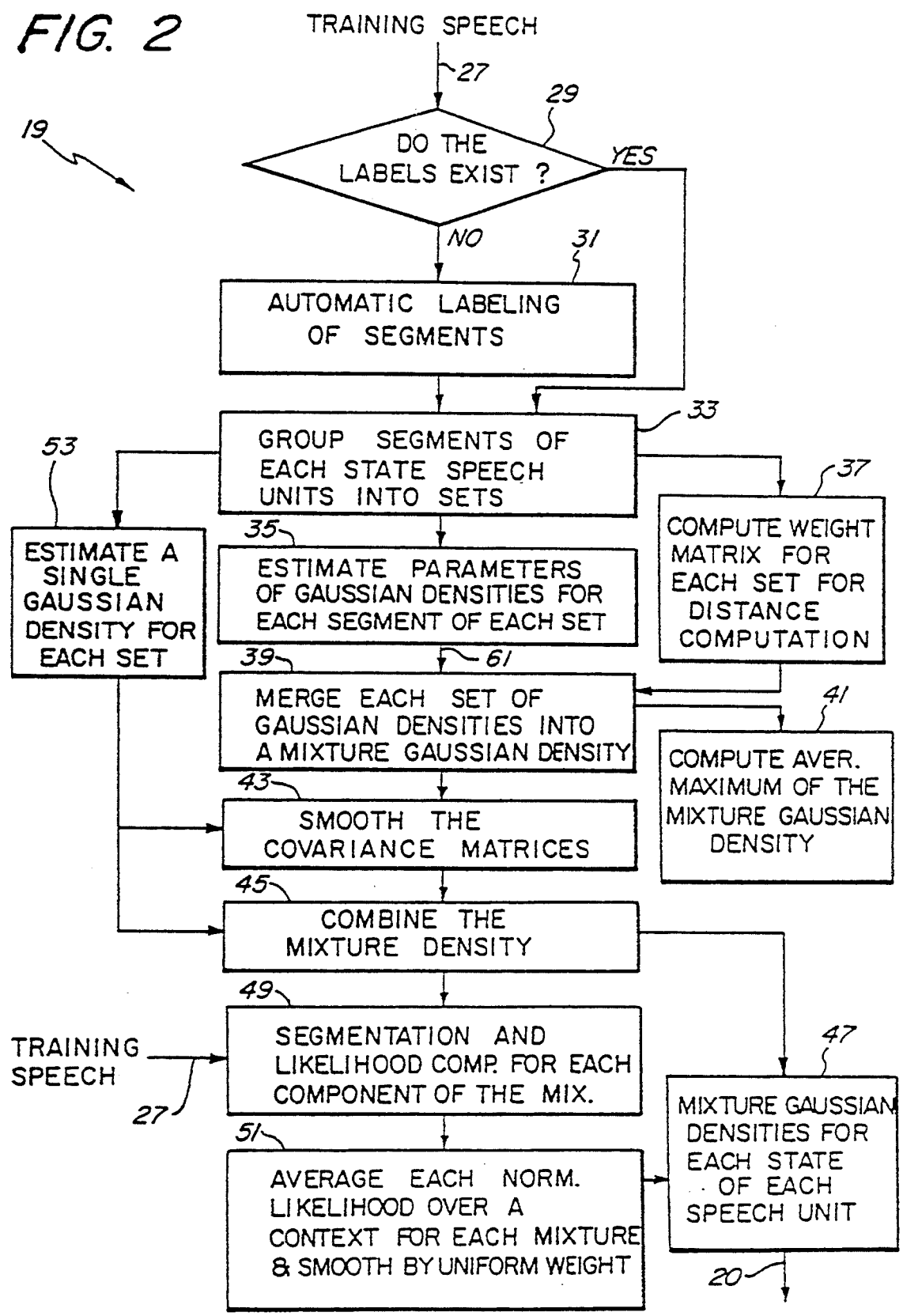
FIG. 2 is a flow chart for estimating mixture Gaussian density models for speech units by the model training module.

FIG. 2 is a detailed flow diagram for the model training module 19. The labels 29 refer to the boundaries of segments in the training speech 27, where each segment corresponds to a state of a speech unit in HMM terminology.

When the labels for the boundaries of the segments are readily available, i.e., are part of the database, they are used together with the speech feature sequence in the training module 19. In case such labels do not exist, a submodule 31 will do the segmentation and labeling.

The segmentation is based on the Viterbi decoding algorithm. Using a reference text, the transcription of words in terms of the phoneme-sized speech units, and some simple probabilistic models of the speech units with preferred topological structure of the HMM models, the submodule 31 can generate all the necessary labels for segment boundaries. Note that the number of states in a speech unit are not necessarily limited to three, such as B, M, E shown in FIG. 3(b). Simple probabilistic models for the speech units can be obtained from a small amount of training speech data which are readily available. The manner of operation of the submodule for segmentation is well known in the prior art and will not be explained in detail in the present invention, for the purpose of clarity and brevity.

FIG. 3(b) illustrates a preferred training speech sentence 27 received from database 11, with the sentence being segmented into words, the words segmented into phonemes, and the phonemes into states, as would be performed by the automatic segment labeling module 31. FIG. 3(a) shows the waveform 53 of a sentence being segmented into a word string, "Jane may earn more money by working hard." FIG. 3(b) shows the segmentation of the words "working," having a waveform 55, and "hard," having a waveform 57, into respective phonemes and states. The phonemes for "working" are w, er, kcl, k, ix, ng. The phonemes for "hard" are hh, aa, r, dcl, d. FIG. 3(b) also shows the labels B, M, and E, for the states of the phonemes /hh/, /aa/, and /r/ in the word "hard."

For each segment consisting of a number of successive frames, the parameters of the Gaussian density, a mean vector $\mu$ and a covariance matrix C, are calculated by sample mean and sample covariance, and the number of frames in the segment is recorded. Let such a segment be indexed by i, its number of frames be $L_i$, and the lth feature vector within the segment be $x_l^{(i)}$, then the sample mean and sample covariance are computed as:

$$\hat{\mu}_i = \frac{1}{L_i} \sum_{l=1}^{L_i} x_l^{(i)} \tag{1}$$

and $$\hat{C}_i = \frac{1}{L_i} \sum_{l=1}^{L_i} (x_l^{(i)} - \hat{\mu}_i)(x_l^{(i)} - \hat{\mu}_i)', \tag{2}$$

where in equation (2) the prime "′" is a vector transpose operation. The parameters of the Gaussian densities of the segments belong to the same state of the same speech unit or word, since they were sorted together by submodule 33 (FIG. 2).

Figure 4:
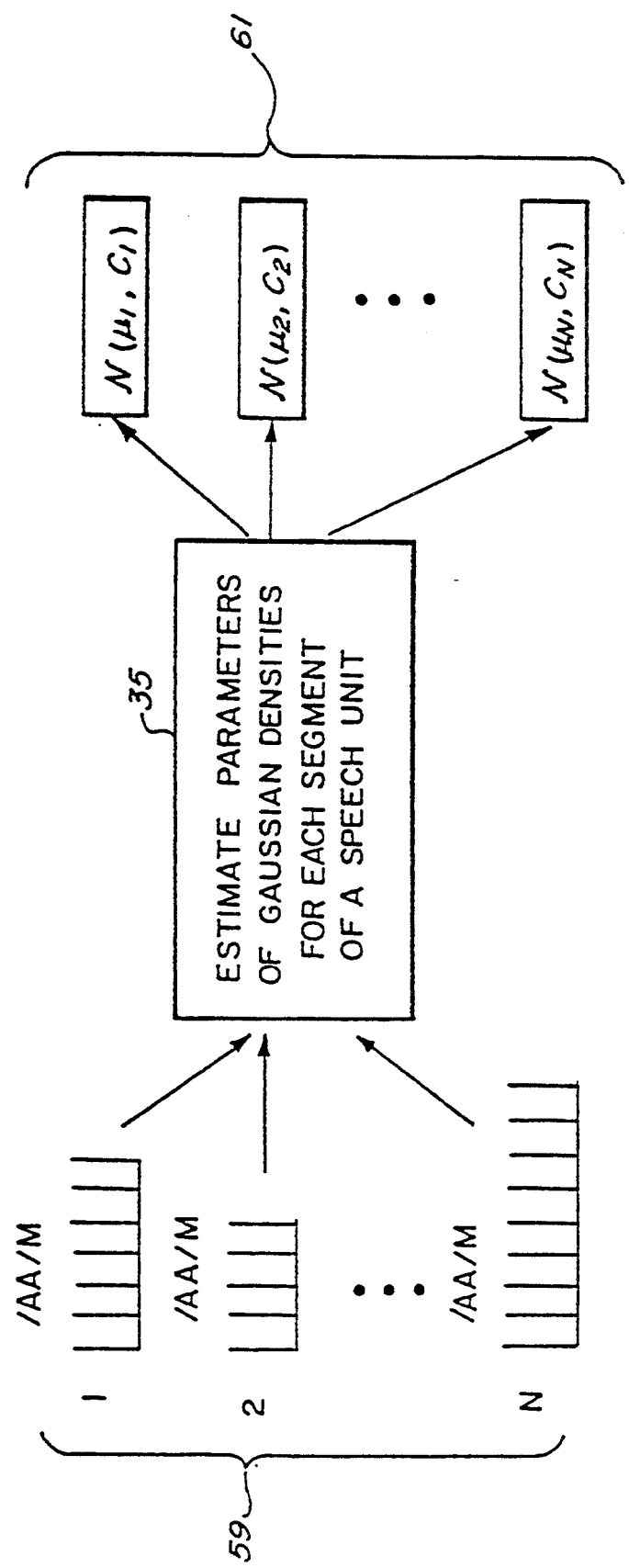
FIG. 4 is a diagrammatic illustration showing segments corresponding to the same state of the same speech unit being grouped together and their Gaussian density parameters estimated.

FIG. 4 illustrates the segments 59 of the state M of the speech unit of phoneme /aa/ being grouped together. Their Gaussian density parameters are then estimated by module 35 and arranged together as a set 61. Each set of the Gaussian density parameters corresponding to a state of a speech unit are then merged into a mixture Gaussian density by the module 39 (FIG. 2).

Figure 5:
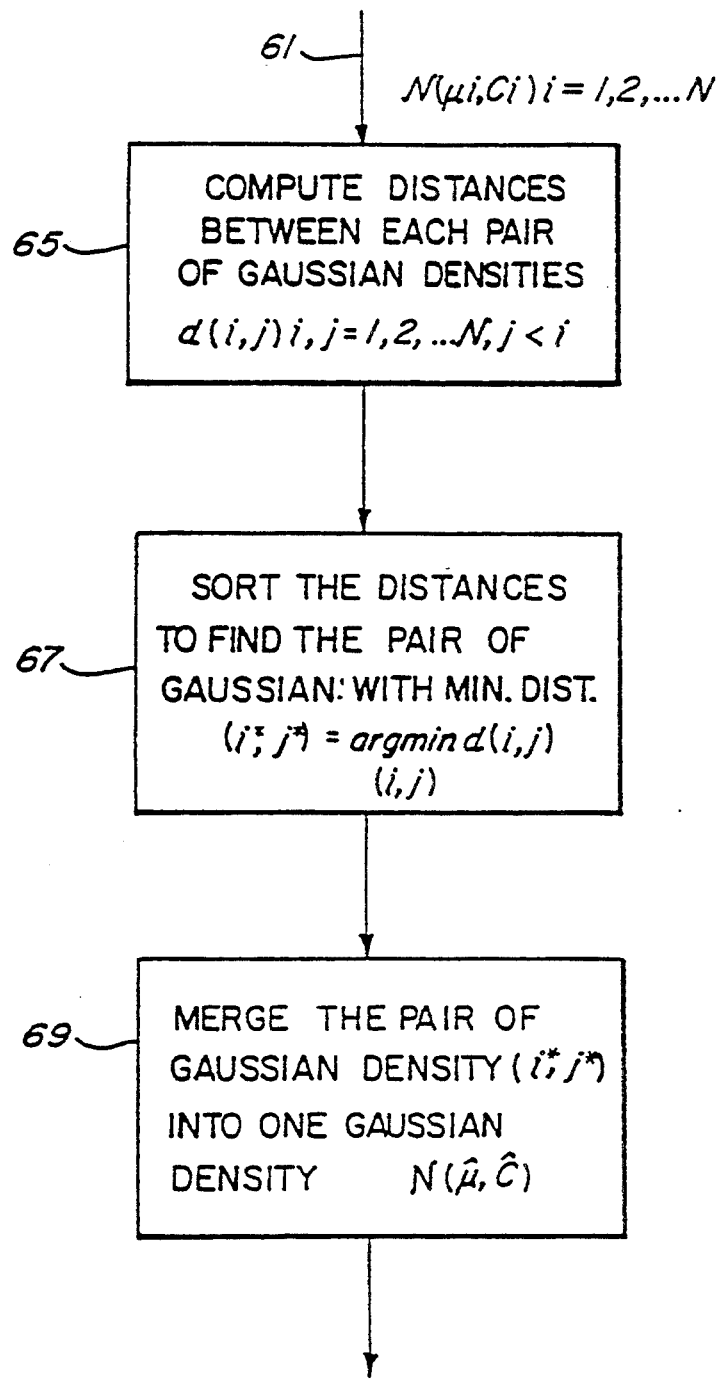
FIG. 5 is a flow diagram showing one step in the model merging procedure, where one pair of Gaussian densities are merged from among N Gaussian densities.

FIG. 5 shows a procedure for merging one pair of Gaussian densities from among N Gaussian densities. First, the distances between all pairs of Gaussian densities in a set are calculated 65. Then the indices of the pair of Gaussian densities with the minimum distance are searched 67. In FIG. 5 the indices of this pair are illustrated as i* and j*. This pair of Gaussian densities $(\mu_{i*}, C_{i*})$ and $(\mu_{j*}, C_{j*})$, are then merged 69 into a single Gaussian density $N(\mu, C)$ through the following operation:

$$\lambda_i^* = \frac{L_i^*}{L_i^* + L_j^*} \tag{3}$$

$$\lambda_j^* = \frac{L_j^*}{L_i^* + L_j^*}$$

$$\hat{\mu} = \lambda_i^* \mu_i^* + \lambda_j^* \mu_j^* \tag{4}$$

$$\hat{C} = \lambda_i^* C_i^* + \lambda_j^* C_j^* + \lambda_i^* \lambda_j^* (\mu_i^* - \mu_j^*)(\mu_i^* - \mu_j^*)' \tag{5}$$

-continued and $$\hat{L} = L_i^* + L_j^*.$$

Figure 6:
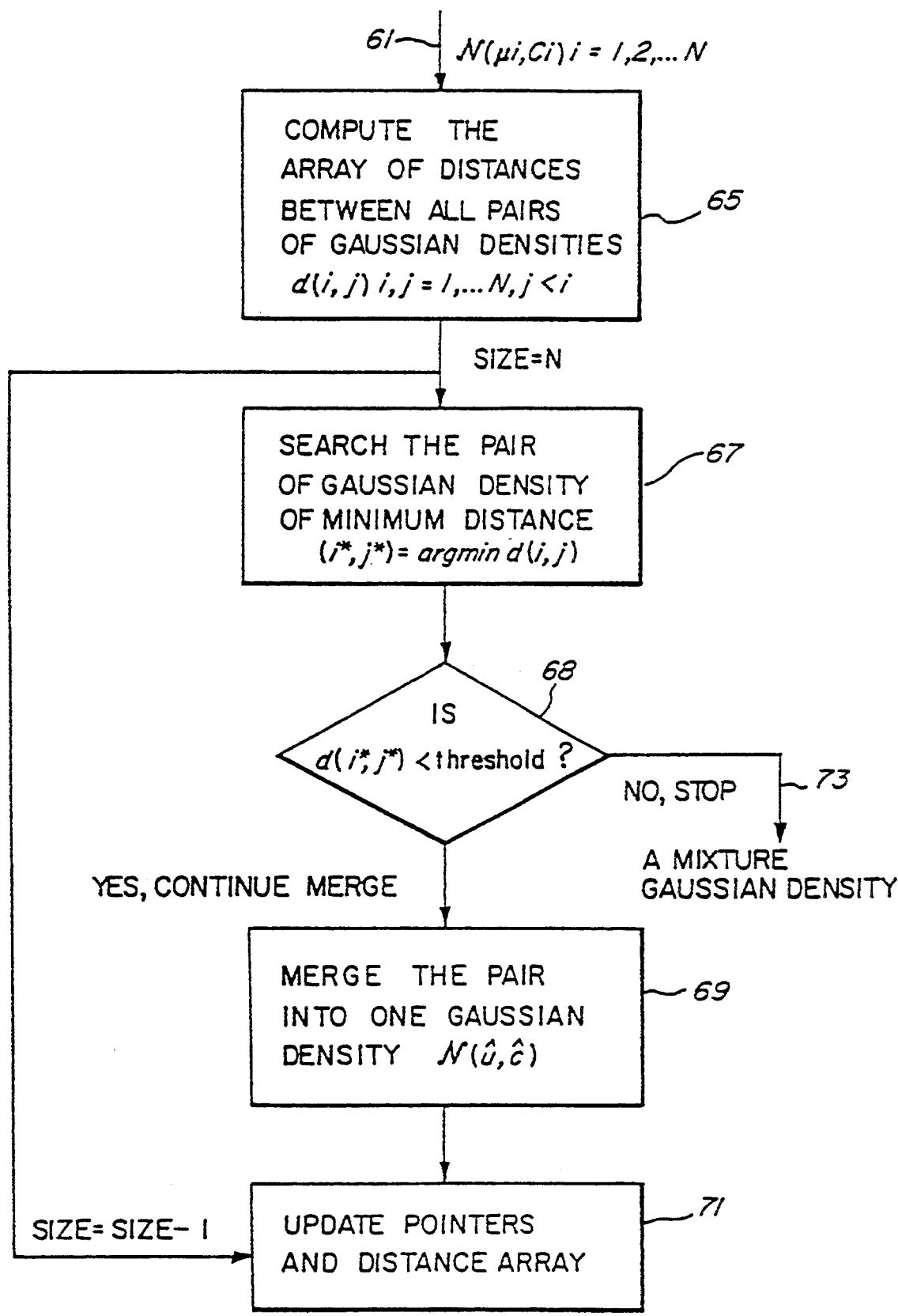
FIG. 6 is a flow chart illustrating the iterative procedure of model merging, where N Gaussian densities are merged into a mixture density.

The overall procedure of the merging module 39 is shown in the flow diagram of FIG. 6. From the input of the set of Gaussian densities 61, abbreviated as (1), (2) . . . (N), the distances between all pairs of the Gaussian densities are computed 65 and put into a distance array of size N×N. Note that only the lower (or upper) triangular part of the matrix needs to be considered since the distance measure is symmetrical, which will be explained later. Next, the pair of Gaussian densities with the minimum distance is searched 67, and this minimum distance is compared against a threshold value 68. If the minimum distance is above or equal to the threshold value, the merging is completed 69, and the Gaussian densities remaining become the components of the mixture Gaussian density 73. Otherwise, the pair of Gaussian densities with the minimum distance is then merged into a single Gaussian density 69, as was explained in connection with FIG. 5 and defined in Equations (3)-(5). The Gaussian densities i* and j* are eliminated, and the new one is entered into the record as the N+1th Gaussian density designated as N*(N+1) below. The distances between the new Gaussian density and the rest of the Gaussian densities are calculated, and the pointers to the Gaussian densities and the distance array are then updated.

| INITIAL POINTERS TO MODELS | AFTER ONE STEP OF MERGING |
|---|---|
| pr[1] → $\mathcal{N}$(1) | pr[1] → $\mathcal{N}$(1) |
| pr[2] → $\mathcal{N}$(2) | pr[2] → $\mathcal{N}$(2) |
| ... | ... |
| pr[i*] → $\mathcal{N}$(i*) | pr[i*] → $\mathcal{N}$(i* + 1) |
| ... | ... |
| pr[j*] → $\mathcal{N}$(j*) | pr[j*] → $\mathcal{N}$(j* + 2) |
| ... | ... |
| pr[N − 1] → $\mathcal{N}$(N − 1) | pr[N − 1] → $\mathcal{N}$*(N + 1) |
| pr[N] → $\mathcal{N}$(N) | |

First, the pointers of the Gaussian densities are updated 71 as shown above. Assuming j*>i*, the Gaussian densities (i*) and (j*) are eliminated. The pointers from i* to j*−1 points to the indices of models shifted up by one, and the pointer from j* to N−2 points to the indices of models shifted up by two. The new Gaussian density is now pointed to by the N-lth pointer.

INITIAL DISTANCE ARRAY

|  | pr[1] | pr[2] | pr[3] | ... | pr[i*−1] | pr[i*] | ... | pr[j*−1] | pr[j*] | ... | pr[N−1] | pr[N] |
|---|---|---|---|---|---|---|---|---|---|---|---|---|
| pr[1] | | | | ... | | | | | | | | |
| pr[2] | x | | | ... | | | | | | | | |
| pr[3] | x | x | | ... | | | | | | | | |
| ... | ... | ... | ... | ... | | | | | | | | |
| pr[i*] | ⊠ | ⊠ | ⊠ | ... | ⊠ | | | | | | | |
| pr[i*+1] | x | x | x | x | x | ⊠ | | | | | | |
| ... | ... | ... | ... | ... | ... | ⊠ | | | | | | |
| pr[j*] | ⊠ | ⊠ | ⊠ | ... | ⊠ | ⊠ | ⊠ | ⊠ | | | | |
| pr[j*+1] | x | x | x | x | x | ⊠ | x | x | ⊠ | | | |
| ... | ... | ... | ... | ... | ... | ⊠ | ... | ... | ⊠ | | | |
| pr[N] | x | x | x | x | x | ⊠ | x | x | ⊠ | x | x | |

AFTER ONE STEP OF MERGING

|  | pr[1] | pr[2] | pr[3] | ... | pr[i−1] | pr[i] | ... | pr[N−2] | pr[N−1] |
|---|---|---|---|---|---|---|---|---|---|
| pr[1] | | | | ... | | | | | |
| pr[2] | x | | | ... | | | | | |
| pr[3] | x | x | | ... | | | | | |
| ... | ... | ... | ... | ... | | | | | |
| pr[i] | x | x | x | ... | x | | | | |
| ... | ... | ... | ... | ... | ... | | | | |
| pr[N−1] | ⊗ | ⊗ | ⊗ | ... | ⊗ | ⊗ | ⊗ | ⊗ | |

Second, the distance array is updated 71, as shown above. The elements in the distance array associated with indices i* or j* are all eliminated, shown as the boxed elements in the i*th, j*th rows and columns. The array elements are then shifted toward the upper-left direction to fill up the array. Specifically, the rows from i*+1 to j*−1 are shifted up by one row, and the rows from j*+1 to N are shifted up by two; the columns from i*+1 to j*−1 are shifted left by one column, and the columns from j*+1 to N are shifted left by two. The distances between the newly-merged Gaussian density and the remaining Gaussian densities are appended to the last row of the array shown as the circled elements, and the updated array size becomes (N−1)×(N−1).

After the pointers of Gaussian densities and the distance array are updated 71, they are fed back to module 67 for searching the Gaussian density pair with minimum distance, and the whole process repeats until the minimum distance exceeds the threshold value. The remaining Gaussian densities become the components of the mixture Gaussian density 73 for a state of a speech unit. The threshold is an empirical value, and can be adjusted to a range for the desired resolution of models for discrimination between speech units.

An alternative preferred procedure for the merging module 39 is shown in FIG. 7, which adds a series of steps 79 to the procedure 77 of FIG. 6. The modified procedure of FIG. 7 is significantly faster than the procedure of FIG. 6 when the size of the set of Gaussian densities to be merged is large.

The procedure of FIG. 6 generates a mixture density from a set of Gaussian densities by iteratively merging a pair of densities at a time. The selected pair has a minimum weighted Euclidian distance, and the merging of the pair results in a minimum trace increment. This method requires a comparison of distances over all model pairs for merging a single pair of densities. The procedure becomes slow when N is large, since the total number of comparisons is $O(N^3)$.

The merging procedure of FIG. 7 consists of two parts: inside the dotted block 79 is the new procedure or steps for this modification, and outside the dotted block is the procedure 77 described in FIG. 6. The added procedure in block 79 merges the Gaussian densities based on the same criterion of minimizing the increment of average trace. However, instead of merging a single pair of Gaussian densities at a time, the procedure merges K density pairs into their respective K densities at a time. In the following description, this will be referred to as the procedure of K-pair-at-a-time, whereas the procedure of FIG. 6 will be the procedure of one-pair-at-a time. Therefore, the modified procedure of FIG. 7 can be described as a combination of a few passes of K-pair-at-a-time plus a one-pair-at-a-time at the end.

In FIG. 7, the first step 81 is to compute the number of passes for the K-pair-at-a-time merging. The number N is the number of Gaussian densities in the original set to be merged into a mixture density, K is the number of densities to be merged by the K-pair-at-a-time procedure at one iteration, and Q is the number of densities remaining to be merged by the one-pair-at-a-time. The bracket [] takes the integer part of the number (N-Q)/K and, therefore, the number R-1 counts the number of passes the K-pair-at-a-time merge needs to go through.

The procedure of the K-pair-at-a-time merging of FIG. 7 consists of three basic steps, shown as the three blocks 85, 87, and 89 following the decision block 83. If the decision in block 83 regarding number of iterations required being greater than 1 is "Yes," then the K-pair-at-a-time is activated. In the first step 85, the distances between all pairs of remaining Gaussian intensities in the set are calculated, where the distance is defined as:

$$d(i,j) = (p_i + p_j)\lambda_i \lambda_j \| A(\mu_i - \mu_j) \|^2.$$

In the second step 87, the distances are sorted into a list of increasing order:

$$d(i_1, j_1) \leq d(i_2, j_2) \leq \ldots \leq d(i_N, j_N).$$

The sorting can be done using the widely-available library routines such as a Quick sort (see W. H. Press et al., Numerical Recipes in C, Cambridge, 1988). When the number of Gaussian densities is N, the total number of distances in the list is $$\frac{N(N-1)}{2}.$$

In the list, $i_k$ $j_k$, but some of the $i_k$'and $j_k$'s duplicate themselves, e.g., $i_k = i_{k'}$, k k'. In the third step 89, the density pairs indexed by the distance list are merged from the start of the list, until K pair of them are merged into K respective densities. In the process of merging, a flag is kept for each density. If a density is merged, the flag is set, so that any density pairs involving this density will not be merged. The merging of a pair of Gaussian densities into one density uses the formula (3), (4), (5) set forth above. Since the Quick sort is O(N log N), the merging of K density pairs using K-pair-at-a-time is much faster than the one-pair-at-a-time.

The breakdown of the merging procedure into a few passes of K-pair-at-a-time plus a one-pair-at-a-time 77 at the end is to avoid forced mergings between the density pairs of large distances. The parameters K and Q can be chosen empirically. For example, K=Q=200 is a good choice when the initial number of densities is on the order of $10^3$. The remaining Gaussian densities after R-1 iterations of the K-pair-at-a-time are then merged by the one-pair-at-a-time procedure 77. The remaining Gaussian densities after the one-pair-at-a-time merging become the components of the mixture density 73.

The way to compute the distance between a pair of Gaussian densities is derived from the consideration of minimizing the increment of the average trace of the covariance matrices of the Gaussian densities when a pair of them are merged into one. The average trace is defined as $$T_N = \sum_{i=1}^{N} p_i \, \text{trace}(C_i)$$

where $$p_i = \frac{L_i}{\sum_{n=1}^{N} L_n}.$$

When the pair of Gaussian densities of i* and j* are merged, the remaining Gaussian densities will have an average trace as $$T_{N-1} = T_N + (p_{i^*} + p_{j^*})\lambda_{i^*}\lambda_{j^*} \| \mu_{i^*} - \mu_{j^*} \|^2,$$

where the $\lambda$'s are calculated as in Equation (3) and the $\| \cdot \|$ denotes a Euclidean distance. Therefore, the distance between a pair of Gaussian densities i and j is defined as $$d(i,j) = (p_i + p_j)\lambda_i \lambda_j \| \mu_i - \mu_j \|^2.$$

In the case that a feature vector consists of components of different scales, weighting factors on these components in the distance computation are incorporated. The new distance is then calculated as $$d(i,j) = (p_i + p_j)\lambda_i \lambda_j \| A(\mu_i - \mu_j) \|^2,$$

where $A = \text{diag}(\alpha_1, \ldots, \alpha_i, \ldots, \alpha_M)$, and M being the dimensionality of the feature vector. The weight matrix A can be derived from training speech data in a variety of ways, and is computed for each state of each speech unit. Described below is a method of computing A for a specific choice for the structure of the feature vector:

$$\begin{bmatrix} c_1 \\ \ldots \\ c_L \\ p \\ \Delta c_1 \\ \ldots \\ \Delta c_L \\ \Delta p \end{bmatrix}$$

The expression above illustrates a choice for the feature vector with four scales, where $c = [c_l, \ldots c_L]'$ is a vector of the weighted cepstrum coefficients; for example, the lineally weighted capstrum coefficients; see Hansen et al., "Spectral Slope Distance Measures with Linear Predictive Analysis for Word Recognition in Noise," IEEE Trans. ASSP, ASSP-34, pp. 52–59, 1986, p is the logarithmic energy, both are per-frame-based features and are called instantaneous features; $\Delta c = [\Delta c_l,$ ... $\Delta c_L]'$ is a vector of temporal regression coefficients of c, and $\Delta p$ is the temporal regression coefficient of p, both are derived from the frames of the symmetric neighborhood of the current frame and are called dynamic features. Let there be a total number of K frames of features for a state of a speech unit under consideration, then four quantities are calculated as $$r_1 = \sum_{k=1}^{K} ||c_k||^2, r_2 = \sum_{k=1}^{K} p_k^2,$$

$$r_3 = \sum_{k=1}^{K} ||\Delta c_k||^2, \text{ and } r_4 = \sum_{k=1}^{K} (\Delta p_k)^2.$$

Letting $$S = \frac{1}{r_1} + \frac{1}{Lr_2} + \frac{1}{w_d r_3} + \frac{1}{w_d L r_4},$$

the diagonal elements of A are then calculated as $$a_i = \begin{cases} \frac{1}{r_1} S^{-1} & i \sim c \\ \frac{1}{Lr_2} S^{-1} & i \sim p \\ \frac{1}{w_d r_3} S^{-1} & i \sim \Delta c' \\ \frac{1}{w_d r_4} S^{-1} & i \sim \Delta p \end{cases}$$

where $i \sim c$ denotes those i indexing the elements of the vector c, and so on. The weight $w_d$ is a parameter to control the weight on the dynamic features, which can be chosen empirically, e.g., $W_d = 2$ is a good choice.

The smoothing module 43 (FIG. 2) smooths the covariance matrices of the Gaussian densities of a mixture density by the covariance matrix of the fully-merged Gaussian density. The fully merged Gaussian density is estimated from all segments in a set of a state of a speech unit, i.e., $$\mu = \frac{1}{\sum_{i=1}^{N} L_i} \sum_{i=1}^{N} \sum_{l=1}^{L_i} x_l^{(i)}$$

and $$C = \frac{1}{\sum_{i=1}^{N} L_i} \sum_{i=1}^{N} \sum_{l=1}^{L_i} (x_l^{(i)} - \mu)(x_l^{(i)} - \mu)'$$

wherein N is the number of Gaussian densities in the set. This smoothing is mandatory for the case when the covariance matrices of some mixture components are singular or near singular. The smoothing operation can also increase the robustness of a mixture Gaussian density model when it was not trained from enough speech data, which is often the case. Specifically, the smoothing is done by interpolating the covariance matrix $C_i$ of a mixture component by the covariance matrix C of the fully-merged Gaussian density, i.e., $$\hat{C}_i = \lambda C_i + (1 - \lambda) C$$

where $0 \leq \lambda \leq 1$. If a covariance matrix has a block diagonal structure such as shown below:

$$\begin{bmatrix} C_2 & 0 \\ 0 & C_d \end{bmatrix},$$

the smoothing can also be done selectively on different blocks. The covariance matrix above shows a structure of two diagonal blocks $C_s$ and $C_d$, one for the instantaneous features, and the other for the dynamic features. This structure of the covariance matrix is in accord with the simplifying assumption that the instantaneous features and dynamic features are statistically independent. One way of doing the selective smoothing is to smooth the covariance block of the instantaneous feature unanimously, and smooth the covariance block of the dynamic features only when it is singular or has too sharp a distribution.

The sharpness of a Gaussian distribution can be measured by its height at its mean point, i.e., $$f(x; \mu_i, C_i)|_{x=\mu_i} \sim \frac{1}{|C_i|^{\frac{1}{2}}}.$$

where "$\sim$" signifies "proportional to." Therefore the geometric average height of the mixture components of a mixture density is proportional to $$\frac{1}{\left( \prod_{k=1}^{K} |C_k|^{\frac{1}{2}} \right)^{\frac{1}{K}}}.$$

For a mixture component i, a ratio is calculated as $$\text{ratio} = \frac{1/|C_i|^{\frac{1}{2}}}{1/\left( \prod_{k=1}^{K} |C_k|^{\frac{1}{2}} \right)^{\frac{1}{K}}}.$$

If this ratio is greater than a threshold, the covariance matrix is smoothed, otherwise it is left intact. Note that the covariance matrix $C_i$ explained can be substituted by the covariance matrix blocks $C_s$ or $C_d$ for block-wise smoothing.

In 45 of FIG. 2, the fully-merged Gaussian density from 53 is added to the smoothed mixture density from 43 as an extra mixture component for further improving model robustness. Therefore, the mixture densities from 45 have one more component than those from 43.

The weights of the mixture density are estimated in the modules 49 and 51 of FIG. 2. First, feature vector sequences are segmented into states of speech units, the reference models being the newly-generated mixture densities with uniform weights. The likelihood scores of each component are calculated and normalized on a per-frame basis. Let the likelihood score of a mixture component at a frame indexed by t be:

$$f(x_t/N(i)) = \frac{1}{(2\pi)^{M/2}|C_i|^{\frac{1}{2}}} \exp\left( -\frac{1}{2}(x_t - \mu_i)C_i^{-1}(x_t - \mu_i)' \right),$$

then the normalized score is:

$$\bar{f}(x_t/N(i)) = \frac{f(x_t/N(i))}{\sum_{k=1}^{K} f(x_t/N(k))}.$$

These normalized scores are then averaged over each state of each contextual environment of a speech unit. A contextual environment of a speech unit is defined by the speech units within its neighborhood. For example, for the speech unit /aa/, the speech unit /hh/ and /r/ constitutes a neighborhood, as was shown in FIG. 3(b). Let the set of normalized scores of a state of a contextual environment of a speech unit be indexed by $t = 1, \ldots, T$, then the weight of the ith mixture component is calculated as $$\alpha_i = \frac{1}{T} \sum_{t=1}^{T} \bar{f}(x_t/N(i)), \ i = 1, \ldots K.$$

The weights thus estimated are further interpolated by uniform weights to maintain robustness, i.e., $$\hat{\alpha}_i = \lambda \alpha_i + (1 - \lambda) \frac{1}{K}, \ i = 1, \ldots, K$$

where $0 < \lambda < 1.0$.

Finally, the model-training module 19 outputs 20 the mixture Gaussian densities for each state of each speech unit and the mixture weights for each state of each context environment of each speech unit to a sentence decoder 21. The parameters of the Gaussian densities and their weights are then used as models in speech recognition in sentence decoder 21, which may continuously receive a speech sentence 23 and output the decoded word string 25.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A speech recognition system including a training module for estimating mixture Gaussian densities for use in speech-unit models of the speech recognition system, said speech recognition system comprising:
   means for receiving an input speech signal;
   segmentation means for segmenting said received input speech signal into a plurality of speech units, each speech unit having a plurality of states, each state of each speech unit representing a segment of said signal, each segment including a plurality of frames;
   means for grouping all segments corresponding to like speech unit states for like speech units into respective sets of segments for all states of all speech units;
   means for estimating parameters defining a Gaussian density for each segment of each set of segments;
   means for merging the Gaussian densities in each set of segments into a mixture Gaussian density through successive merging of a plurality (k) of pairs of said Gaussian densities of each set of segments into (k) Gaussian densities, wherein k is an integer, wherein a plurality of mixture Gaussian densities, one for each set of segments, are created;
   means for estimating weights for each one of said mixture Gaussian densities, one weight for each Gaussian density in a mixture Gaussian density; and
   means for using the mixture Gaussian densities and the estimated weights therefore from said means for estimating weights for identifying speech units of additional input speech signals.

2. The speech recognition system of claim 1, wherein said means for merging comprises:
   means for calculating distances between all pairs of Gaussian densities in a set;
   means for sorting the calculated distances into a list of distances in increasing order to find Gaussian density pairs separated by small distances; and
   means for merging said Gaussian pairs from the start of the list until k pairs are merged into k respective Gaussian densities.

3. The speech recognition system of claim 2, wherein said means for merging said Gaussian densities into a mixture Gaussian density includes means for merging a single pair of Gaussian densities at each time said means for merging a single pair of Gaussian densities at each time comprises:
   means for calculating, for each pair of Gaussian densities in the set, a distance separating the Gaussian densities of the pair;
   means for comparing the calculated distances to find a Gaussian density pair with a minimum separation distance; and
   means for merging said minimum distance pair into a single Gaussian density.

4. The speech recognition system of claim 2, wherein said minimum distance Gaussian densities of the pair are represented by indices i* and j*, and a said merged Gaussian density is parameterized by $\hat{\mu}$ and $\hat{C}$, and wherein said means for merging said minimum distance Gaussian pair comprises:
   means for calculating $\hat{\mu}$, wherein $\hat{\mu}$ is given by:

$$\hat{\mu} = \lambda_{i^*} \mu_{i^*} + \lambda_{j^*} \mu_{j^*};$$

and means for calculating $\hat{C}$, wherein $\hat{C}$ is given by:

$$C = \lambda_{i^*} C_{i^*} + \lambda_{j^*} C_{j^*} + \lambda_{i^*} \lambda_{j^*} (\mu_{i^*} - \mu_{j^*})(\mu_{i^*} \mu_{j^*})';$$

wherein $\lambda_{i^*}$ is given by:

$$\lambda_{i^*} = \frac{L_{i^*}}{L_{i^*} + L_{j^*}};$$

and wherein $\lambda_{j^*}$ is given by:

$$\lambda_{j^*} = \frac{L_{j^*}}{L_{i^*} + L_{j^*}};$$

wherein $L_{i^*}$ and $L_{j^*}$ represent the number of frames in each subset of segments used to estimate the Gaussian densities $i^*$ and $j^*$.

5. The training module of claim 2, wherein a distance d(i,j) between a pair of Gaussian densities i and j is given by:

$$d(i,j) = (p_i + p_j) \lambda_i \lambda_j \| \mu_i - \mu_j \|^2$$

where $$p_i = \frac{L_i}{\sum_{n=1}^{N} L_n}$$

and $$p_j = \frac{L_j}{\sum_{n=1}^{N} L_n};$$

wherein $L_i$ and $L_j$ represent the number of frames in each subset of segments used to estimate the Gaussian densities $i$ and $j$.

6. The speech recognition system of claim 1 wherein said parameters defining a Gaussian density for each segment comprise $\hat{\mu}$ and $\hat{C}$, and wherein said means for estimating said parameters comprises:

means for calculating $\hat{\mu}$, wherein $\hat{\mu}$ is given by:

$$\hat{\mu}_i = \frac{1}{L_i} \sum_{l=1}^{L_i} x_l^{(i)};$$

wherein i is a segment index, $L_i$ is the number of frames in segment i, and $x_l^{(i)}$ is the lth feature vector in segment i; and means for calculating $\hat{C}$, wherein $\hat{C}$ is given by:

$$\hat{C}_i = \frac{1}{L_i} \sum_{l=1}^{L_i} (x_l^{(i)} - \hat{\mu}_i)(x_l^{(i)} - \hat{\mu}_i)',$$

where the symbol ' denotes the transpose of a vector.

7. A method for speech recognition, said speech recognition method comprising the steps of:
receiving an input speech signal;
segmenting the input speech signal into a plurality of speech units, each speech unit having a plurality of states, each state of each speech unit representing a segment of said signal, each segment including a plurality of frames;
grouping all segments corresponding to like speech unit states for like speech units into respective sets of segments for all states of all speech units;
estimating parameters defining a Gaussian density for each segment of each set of segments;
merging the Gaussian densities in each set of segments into a mixture Gaussian density through successive merging of a plurality (k) of pairs of said Gaussian densities of each set of segments into (k) Gaussian densities, wherein k is an integer, wherein a plurality of mixture Gaussian densities, one for each set of segments, are created;
estimating the weights for each one of said mixture Gaussian densities, one weight for each Gaussian density in a mixture Gaussian density; and
using the mixture Gaussian densities and the estimated weights therefore from said means for estimating weight for identifying speech units of additional input speech signals.

8. The method for speech recognition of claim 7 wherein said step of merging (k) pairs of Gaussian densities comprises the steps of:
calculating distances between all pairs of Gaussian densities in a set;
sorting the calculated distances into a list of distances in increasing order to find Gaussian density pairs separate by small distances; and
merging small distance Gaussian pairs from the start of the list until k pairs are merged into k respective Gaussian densities.

9. The method for speech recognition of claim 8 wherein said minimum distance Gaussian densities of the pair are represented by indices i* and j*, and a said merged Gaussian density is parameterized by $\hat{\mu}$ and $\hat{C}$, and wherein said step of merging said minimum distance Gaussian pair comprises the steps of:

calculating $\hat{\mu}$, wherein $\hat{\mu}$ is given by:

$$\hat{\mu} = \lambda_{i*}\mu_{i*} + \lambda_{j*}\mu_{j*};$$

and calculating $\hat{C}$, wherein $\hat{C}$ is given by:

$$\hat{C} = \lambda_{i*}C_{i*} + \lambda_{j*}C_{j*} + \lambda_{i*}\lambda_{j*}(\mu_{i*} - \mu_{j*})(\mu_{i*} - \mu_{j*})';$$

wherein $\lambda_{i*}$ is given by:

$$\lambda_{i*} = \frac{L_{i*}}{L_{i*} + L_{j*}};$$

and wherein $\lambda_{j*}$ is given by:

$$\lambda_{j*} = \frac{L_{j*}}{L_{i*} + L_{j*}};$$

wherein $L_{i*}$ and $L_{j*}$ represent the number of frames in each subset of segments used to estimate the Gaussian densities $i*$ and $j*$.

10. The method of speech recognition of claim 7, wherein said step of merging said Gaussian densities into a mixture Gaussian density includes a step of merging a single pair of Gaussian densities at each time, wherein said step of merging a single pair of Gaussian densities at each time includes the steps of:
calculating, for each pair of Gaussian densities in the set, a distance separating the Gaussian densities of the pair;
comparing the calculated distances to find a Gaussian density pair with a minimum separation distance; and
merging said minimum distance pair into a single Gaussian density.

11. The method of speech recognition of claim 7, wherein a distance d(i,j) between a pair of Gaussian densities i and j is given by:

$$d(i,j) = (p_i + p_j)\lambda_i\lambda_j \| \mu_i - \mu_j \|^2$$

where $$p_i = \frac{L_i}{\sum_{n=1}^{N} L_n}$$

and $$p_j = \frac{L_j}{\sum_{n=1}^{N} L_n};$$

wherein $L_i$ and $L_j$ represent the number of frames in each subset of segments used to estimate the Gaussian densities $i$ and $j$.

* * * * *